United States Patent [19]

Sansone

[11] Patent Number: 5,802,503
[45] Date of Patent: Sep. 1, 1998

[54] CHANNEL SWITCHED MAIL MESSAGE SWITCHING AND METERING SYSTEM

[75] Inventor: Ronald P. Sansone, Weston, Conn.

[73] Assignee: Pitney Bowes Inc., Stamford, Conn.

[21] Appl. No.: 772,798

[22] Filed: Dec. 24, 1996

[51] Int. Cl.⁶ ............................................. G06F 17/00
[52] U.S. Cl. .................. 705/401; 370/351; 395/200.3; 395/200.68; 395/200.69; 395/200.7; 395/200.71; 707/500
[58] Field of Search ............................ 235/375; 364/400, 364/478.01, 478.07, 478.08, 478.11; 395/101, 114, 200.3, 200.68, 200.69, 200.7, 200.71; 705/7, 8, 400; 707/104, 500, 517, 518, 521; 370/351; 340/826

[56] References Cited

U.S. PATENT DOCUMENTS

| | | | |
|---|---|---|---|
| 4,731,048 | 3/1988 | Marella et al. | 493/188 |
| 4,800,505 | 1/1989 | Axelrod et al. | 364/478 |
| 4,831,555 | 5/1989 | Sansone et al. | 395/113 |
| 4,837,701 | 6/1989 | Sansone et al. | 705/404 |
| 4,908,770 | 3/1990 | Breault et al. | 705/404 |
| 4,941,091 | 7/1990 | Breault et al. | 705/30 |
| 5,051,914 | 9/1991 | Sansone et al. | 364/478.11 |
| 5,067,305 | 11/1991 | Baker et al. | 53/411 |
| 5,068,797 | 11/1991 | Sansone et al. | 364/478.07 |
| 5,072,401 | 12/1991 | Sansone et al. | 364/478.07 |
| 5,119,306 | 6/1992 | Metelits et al. | 705/406 |
| 5,142,482 | 8/1992 | Sansone | 364/478.09 |
| 5,161,109 | 11/1992 | Keating et al. | 705/410 |
| 5,270,938 | 12/1993 | Sansone et al. | 705/406 |
| 5,283,752 | 2/1994 | Gombault et al. | 364/478.09 |
| 5,315,592 | 5/1994 | Conant et al. | 370/401 |
| 5,398,012 | 3/1995 | Derby et al. | 340/826 X |
| 5,424,724 | 6/1995 | Williams et al. | 340/825.05 |
| 5,469,431 | 11/1995 | Wendorf | 370/50 |
| 5,476,255 | 12/1995 | Murcko et al. | 271/109 |
| 5,586,036 | 12/1996 | Pintsov | 705/408 |
| 5,602,742 | 2/1997 | Solondz et al. | 705/410 |
| 5,627,819 | 5/1997 | Dev et al. | 370/250 |
| 5,628,249 | 5/1997 | Cordery et al. | 101/91 |
| 5,649,108 | 7/1997 | Spiegel et al. | 395/200.71 |
| 5,684,706 | 11/1997 | Harmon et al. | 364/468.01 |

*Primary Examiner*—Edward R. Cosimano
*Attorney, Agent, or Firm*—Melvin J. Scolnick; Charles R. Malandra

[57] ABSTRACT

The invention is a method for channeling message traffic along an optimal path to its intended destination. The method is accomplished by drafting a message and a corresponding destination address together in electronic form. The message and address are coupled with a set of parameters which define a method of conversion of the electronic form of the message and address to a tangible form. The message and address are transmitted together with the conversion parameters, as a packet, to a routing facility via a digital carrier. The routing facility will select an optimal transmission path whereby the packet will be transmitted to the terminal node for conversion and printing. The selection of an optimal path is made by analyzing a set of weighted factors pertaining to a set of possible pathways. The combination of weighted scores will be used to determine which path has the highest weighted score. The path with the highest weighted score will be selected, and the transmission will be initiated by the routing facility along that path. The terminal node comprises receiving means for receiving the packet and printing means for converting the electronic message and address to human readable form by printing the message on a medium and printing the destination address on an envelope, from these a finished mail piece is formed and placed into a local mail stream for delivery to the destination address.

12 Claims, 8 Drawing Sheets

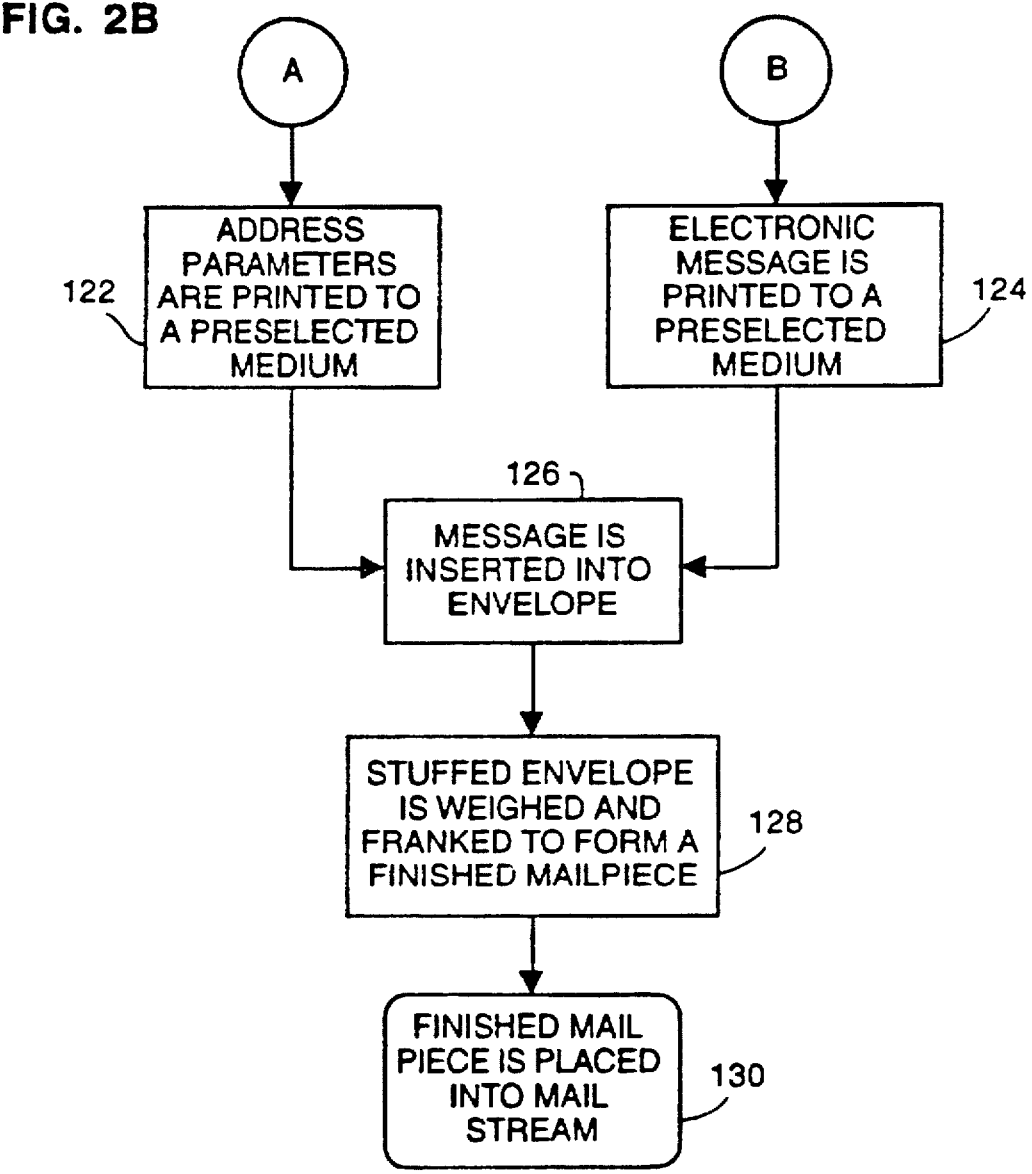

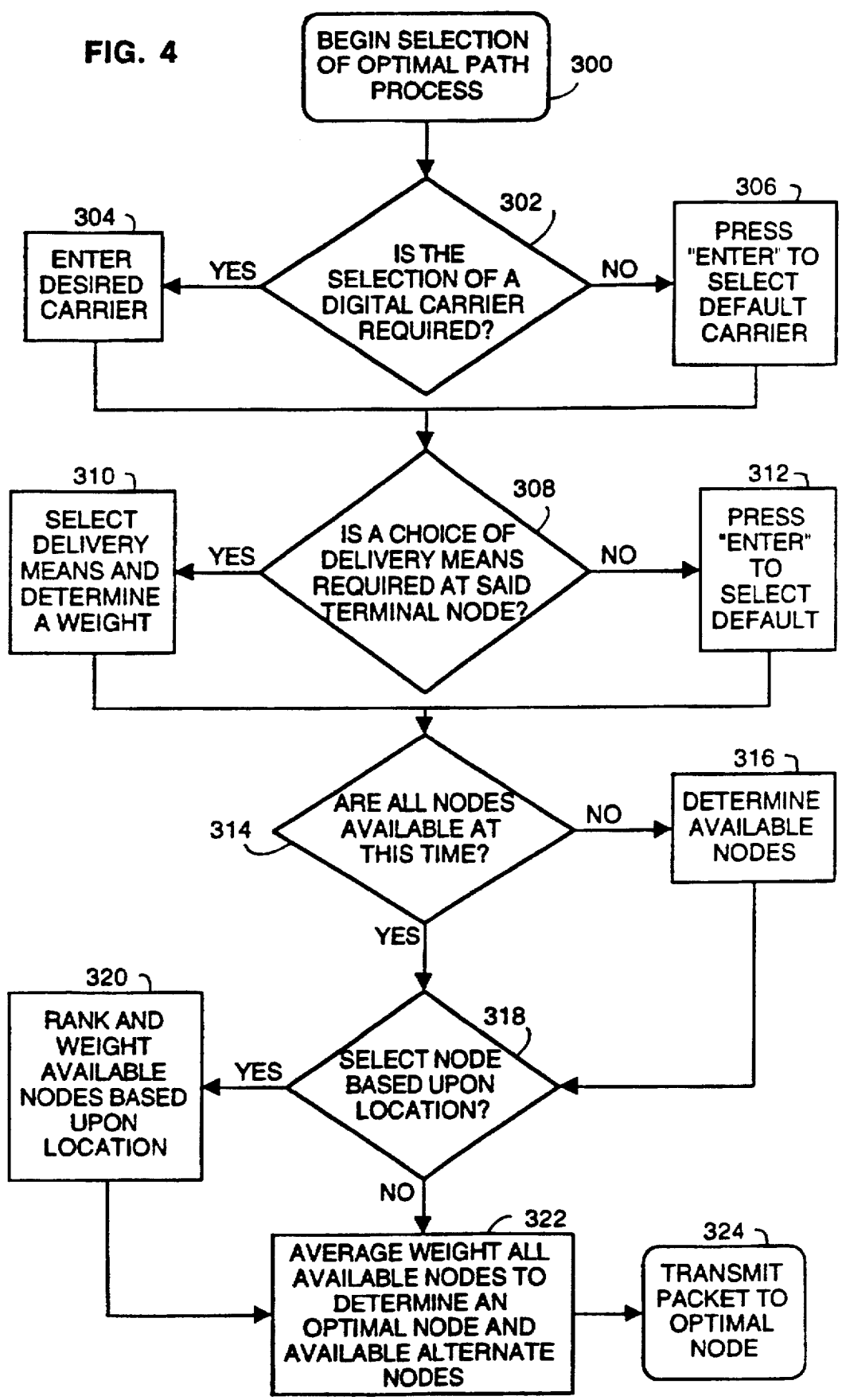

CHANNEL SWITCHED MAIL MESSAGE SWITCHING AND METERING SYSTEM

RELATED APPLICATIONS

Reference is made to application Ser. No. 08/772,788, entitled A METHOD AND SYSTEM FOR WORLDWIDE MEDIA SELECTION, PRODUCTION AND DELIVERY, assigned to the assignee of this application and filed on even date herewith.

Reference is made to application Ser. No. 08/772,790, entitled METHOD AND SYSTEM OF ACCOUNTING FOR TRANSACTION COSTS AND CURRENCY EXCHANGE IN A HYBRID MAIL SYSTEM, assigned to the assignee of this application and filed on even date herewith.

Additionally, reference is made to application Ser. No. 08/772,787, entitled A METHOD AND SYSTEM FOR MAIL PIECE PRODUCTION UTILIZING A DATA CENTER AND INTER-RELATED COMMUNICATION NETWORKS, assigned to the assignee of this application and filed on even date herewith.

BACKGROUND OF THE INVENTION

Traditional mail channels moved a mail piece from point A to point B over a fixed channel. Input to the channel is made at post offices, drop boxes, contract stations, and at post office branch locations. Output is made at post office boxes, city boxes, at rural delivery points and directly at ultimate destinations. Both the input and the output points are connected to a single pipeline or transport channel consisting of postal service handling. With the accelerated development of the personal computer (hereinafter "PC"), alternate points of entry and exit, as well as varied transport channels, have appeared.

Facsimile Transmission and other forms of data communication via modem, radio frequency transmission, satellite communication, and combinations thereof, have grown in use by wide margins in the past fifteen years. As acceptance and use of these channels of communication have grown., so too has the technological capability of the supporting systems. An outgrowth of the ability to communicate has been the development of the InterNet ("the Net") and the World Wide Web ("the Web"). Additionally, the growth of combined channels of communication ("hybrid" channels) has occurred.

Among the hybrid channels available, is hybrid mail. In recent years, the term "hybrid mail" has grown with increased acceptance as the business and technical communities have found better and more efficient ways to utilize the mail stream not only in the United States, but across the global marketplace as well. Hybrid mail is a creature of the evolution of technology and the mail stream. Where once a mail piece was created locally and then dropped into the closest available mailbox for eventual delivery to a remote location, now the entry points into the mail stream are virtually unlimited. Thus, the creation of the hybrid mail piece.

Hybrid mail utilizes a number of factors that take advantage of economies in production, telecommunications, and user interface technologies. The result of the proper balance of economies is the ability of a hybrid mail system to get a finished mail piece to its intended destination more quickly and generally with less expense than would normally be possible with conventional mail systems. Additionally, hybrid mail allows the user to localize currency issues, in cross border applications, by efficiently charging a customer (i.e., a system user) in local currency while franking the mail piece in the currency of the remote location.

A disadvantage of the prior art is that there has not been an effective integration of the various art forms required to produce an effective hybrid mail process. A fully integrated process requires a system, and corresponding interfaces, capable of producing a mail piece from an extensive catalogue of options, transmitting the newly created mail piece to a remote location and then finishing the mail piece remotely while preparing local billing in respect of the service conveyed.

Thus, an objective of the present invention is to provide a cost effective means of defining a mail piece at one location, and then delivering a finished mail piece at its ultimate destination in a relatively shortened time period with the look and feel of a locally assembled product. The person receiving the mail piece at its final destination will receive a finished mail piece that is timely, and franked locally despite having origins that might be quite remote.

SUMMARY OF THE INVENTION

According to the invention, the object is achieved and the disadvantages of the prior art are overcome by a method of channeling message traffic along an optimal path to its intended destination. The method is accomplished by drafting a message and a corresponding destination address together in electronic form. The message and address are coupled with a set of parameters from among a group of choices wherein the parameters define a method of conversion of the electronic form of the message and address to a tangible form so that a predetermined standard for delivery of the message may be met.

Delivery of the message is accomplished by transmitting the message and its destination address via a digital carrier to a terminal node where the electronic form can be converted, by the defined conversion method, to a human readable form. The electronic form is converted to human readable form by, printing the message on a medium and printing the destination address on an envelope. Once printed, a finished mail piece is formed by inserting the printed message into the printed envelope, sealing the envelope, franking the envelope with appropriate postage, and then delivering the finished mail piece into a local mail stream for delivery to the destination address.

The invention anticipates that more than one transmission path is possible for transmission of the electronic message and destination address. Therefore, when the transmission path can be selected from among a group of paths, the message and destination address are transmitted together with the conversion parameters, as a packet, to a routing facility via a digital carrier. The routing facility will select a transmission path and assign a set of transmission parameters whereby the packet will be transmitted to the terminal node for conversion and printing. The terminal node comprises receiving means for receiving the packet and the printing means for converting the message and address to human readable form.

The routing facility is the means by which the transmission path to the terminal node is selected. The routing facility and the initiating node can be co-located. The optimal transmission path is selected from among a set or group of available transmission paths and the selection is determined by analysis of a set of factors that comprise: carrier means for carrying the packet to the terminal node; delivery means for delivering the packet to the printing means; time and date standards, if applicable; availability of a particular terminal node from among a predetermined list of possible terminal nodes; and the geographic location of the particular terminal node. Each of the factors to be utilized in making the path selection is weighted. If a particular path on the list is not available due to geographic location, time and date requirements, or malfunction, then that path will be given a zero weight so that it is eliminated from the set of possible transmission paths. The combination of weighted scores will be used to determine which path within the group of available paths has a highest weighted score. The path with the highest weighted score will be selected, and the transmission will be initiated by the routing facility along the optimal transmission path.

It should be noted that an optimal transmission path can comprise a plurality of sub-paths, wherein each of the sub-paths further comprises a channel. Each of the channels are selected from among a wide variety of communication means available for transmitting digitized communications.

BRIEF DESCRIPTION OF THE DRAWINGS

FIGS. 2A and 2B represent a high level flow chart of the invention embodiment.

FIG. 4 is a flowchart of the decision flow used in determining an optimal transmission path.

DETAILED DESCRIPTION OF THE PREFERRED EMBODIMENTS

Figure 1:
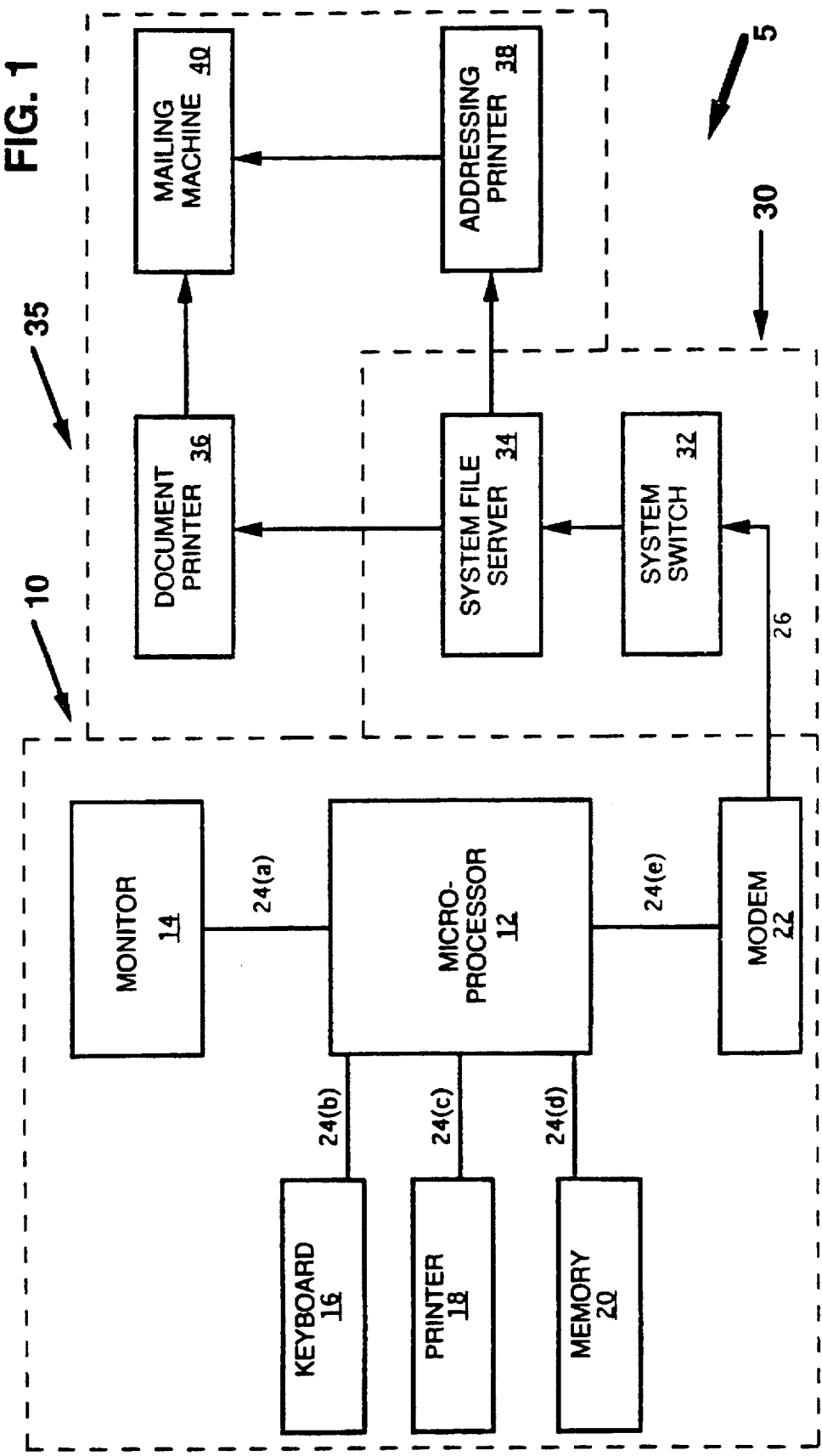
FIG. 1 is a block diagram of the elements of typical initiating and destination nodes within the inventive method.

Turning to FIG. 1, system 5 which is representative of a preferred embodiment of a system that would employ the inventive method, is shown which is comprised of three subsystems. The subsystems are designated as: 10; 30; and 35.

Subsystem 10 represents the system's initiating node. Subsystem 10 node further comprises: microprocessor 12 for processing data assembled and/or created at the initiating node and for supporting the software program which comprises the system method; microprocessor 12 is connected to monitor 14 by cable 24(a), thus providing a visual interface between the system and the system user; keyboard 16 connected to microprocessor 12 by cable 24(b) for data entry and user interface with the system; printer 18 for printing reports and addressing data is connected to microprocessor 12 by interface cable 24(c); memory 20 for storing data is attached to microprocessor 12 by interface cable 24(d); and, modem 22 for communicating data to other nodes or subsystems is connected to microprocessor 12 by interface cable 24(e).

Subsystem 30 receives data from subsystem 10 via data link 26 which connects system switch 32 with modem 22 of the initiating node. Data is received at system switch 32 which determines the optimal routing for the data and then delivers the data to system file server 34 which further directs data to the appropriate devices comprising subsystem 35.

Subsystem 35 comprises: document printer 36 which receives document data from system file server 34; addressing printer 38 which receives address data from system file server 34; and, mailing machine 40 for preparing a finished mail piece.

Figure 2A:
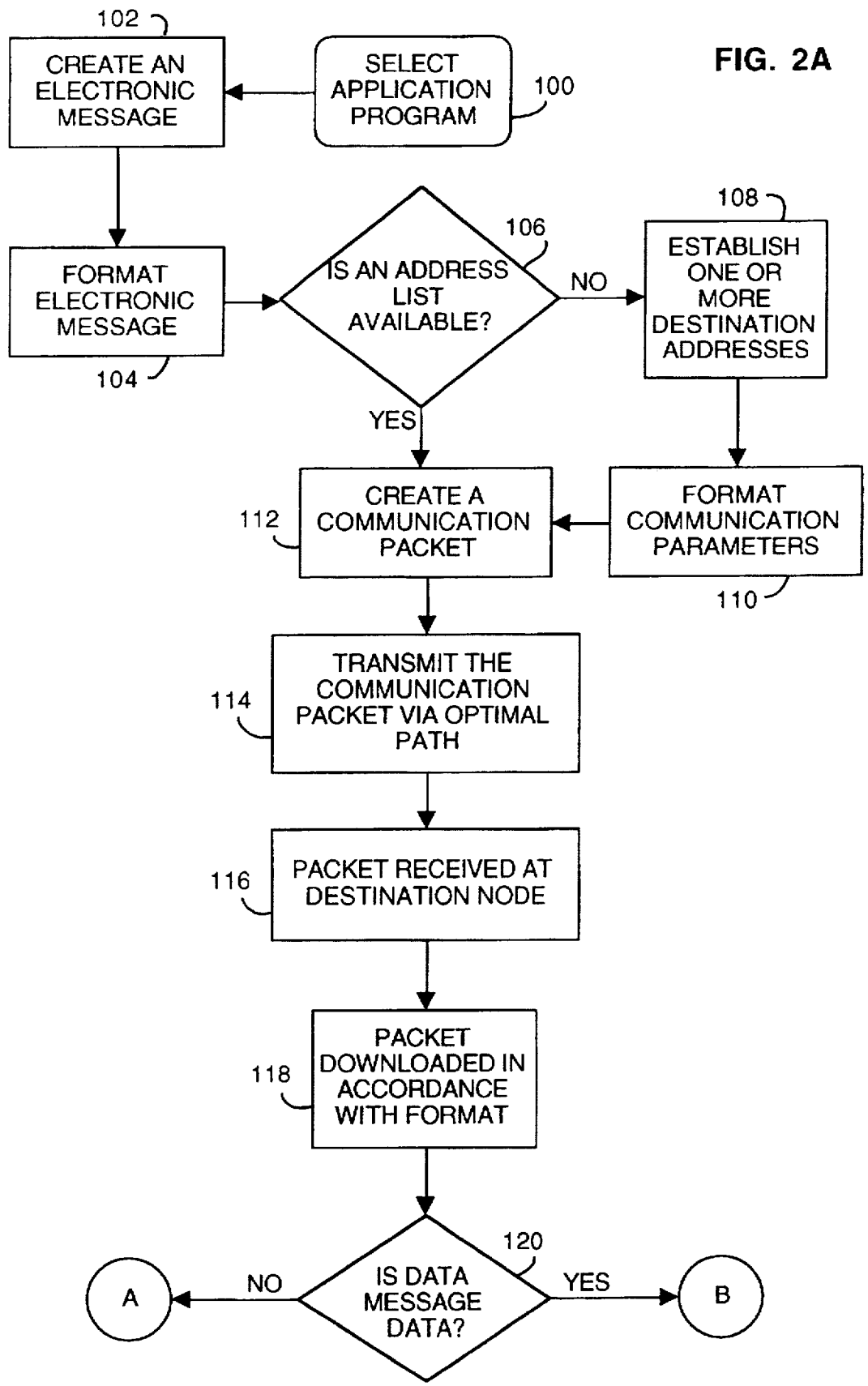

Turning to FIGS. 2A and 2B, there is shown a basic flow of the preferred embodiment. In FIG. 2A, at step 100, the application selection is made by the system operator at a host data processing system. From step 100, the method advances to step 102 where the application program is utilized to create a document that is then stored to the memory of the host data processing system in electronic form. The electronic message is formatted at the time of storage at step 104, before advancing to a query at step 106. At step 106, the query asks whether or not an address list is available to be included with the communication packet to be created at step 112. If the response to the query is "YES," then the method advances to step 112 where the communication packet comprising the formatted electronic message and the address list data is created. If, however, the response to the query at step 106 is "NO," then the method advances to step 108 where data in support of one or more addresses is created to form an address list. The method then advances to step 110 where the address list is assigned communication parameters that will allow it to be placed together with the formatted electronic message so as to form a communication packet at step 112.

From step 112, the method advances to step 114 where the communication packet is transmitted via an optimal communication pathway to a terminal node. The optimal pathway may be, but is not limited to being: a telecommunication link established via modem and maintained over telephone lines (ISDN or otherwise); a radio frequency (RF) transmission; a microwave transmission; a multichannel link (mux); satellite up and down links; or, some combination of the above. The choice of which path may be the optimal path, is detailed in the discussion concerning FIG. 4.

The communication packet is received at the destination node in step 116. There may have been one or more interim nodes between the initiating node and the terminal node. The decision path for interim nodes is detailed in the discussion with respect to FIGS. 3A through 3E. After receipt of the communication packet, the destination node downloads the packet, at step 118, to a specific location within the destination node as determined in accordance with the formatting technique utilized in steps 104 and 110.

The destination node will parse the received data to determine, at step 120, whether or not the data is message data. If the response to the query at step 120 is "NO," then the method advances along path A to re-enter the method flow at step 122 as shown in FIG. 2B. If, however, the response to step 120 is "YES," then the method advances along path B to re-enter the method flow at step 124 as shown in FIG. 2B.

Turning to FIG. 2B, there is shown path A entering the method floss at step 122 and path B entering the method flow at step 124. At step 122, the address parameters are parsed from the communication packet and the addresses are printed to a pre-selected medium in the form of one address to each piece of media; the addresses can be printed in the form of a list, or the addresses can be printed in both forms. At step 124, the electronic message is parsed from the communication packet and the message is printed to a pre-selected medium as required. Both steps 122 and 124, advance to step 126.

The printed message is inserted into the printed envelope at step 126. There are a number of variations possible of this embodiment. Depending upon the nature of the destination node equipment and/or application software utilized during the printing steps, it is possible to print upon the envelope or other media after the envelope has been stuffed. At any rate, the information printed to the envelope can simply be limited to address data, or the printed data can include, but not be limited to: a bar code, a commercial message and/or slogan, or a graphic.

From step 126, the method advances to step 128 where the stuffed envelope is sealed, weighed and then franked with a postage value appropriate to the weight, service, and/or destination address. The franked envelope is now considered a finished mailpiece. The finished mailpiece is then placed at step 130, into the mail stream local to the destination node.

FIGS. 3A, 3B, 3C, 3D and 3E detail the tiers of communication between an initiating node and a terminal node.

Figure 3A:
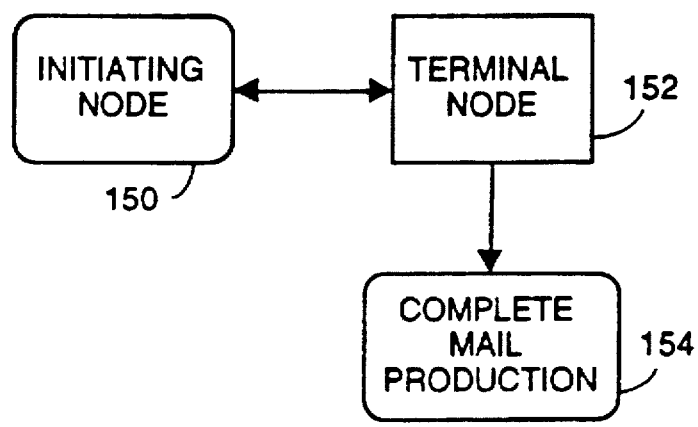
FIGS. 3A through 3E are flowcharts of the nodal paths as the paths increase in possible complexity due to interim relay points.

Turning to FIG. 3A, there is shown a communications path that is the most direct contemplated by the invention described herein; that is, where the initiating node and the terminal node are co-located. At step 150, a mailing job is defined by the system user at the initiating node. After the mailing job has been defined, the initiating node is in direct communication with the terminal node at step 152; it is the terminal node that will produce, at step 154, the mailing as defined at the initiating node. Co-location of the initiating and terminal nodes is possible where the system user defines the mailing job at the terminal node site (e.g., if an over-the-counter embodiment were contemplated where the system user were to utilize a counter service for placing the mailing job order).

Figure 3B:
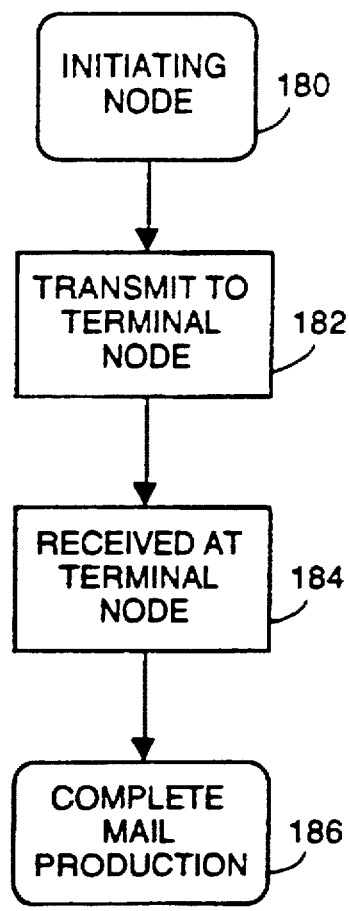

In FIG. 3B, there is shown a communications path where the initiating node is in direct communication with the terminal node, but the initiating and terminal nodes are in separate locations. At step 180, the initiating node would define the mailing parameters and transmit those parameters to the terminal node at step 182. At step 184, the terminal node would receive the mailing job parse the instructions and then set-up the mailing for production. The method would complete the mailpiece production at step 186.

Figure 3C:
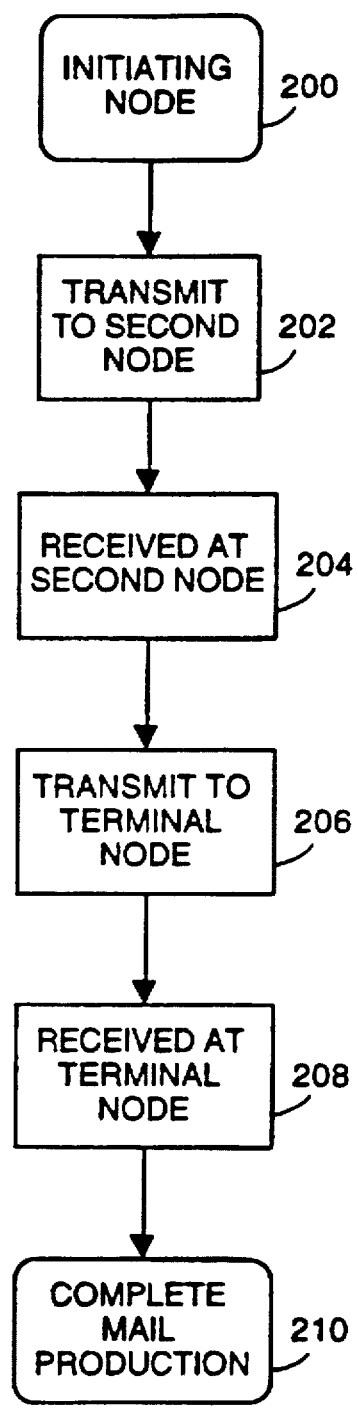

FIG. 3C takes the communications path of FIG. 3B and adds an additional layer of processing. The value to an additional layer is in the presence of a back-up system, either for redundancy in case of a malfunction at one level or, simply to have regional locations receive communications from outlying districts for retransmission to a central hub. The latter would allow mailings to be produced at locations closer to the mail destination points or simply allow cost efficiencies to be added by re-routing communications.

In FIG. 3C, the initiating node would define the mailing parameters at step 200 and transmit those parameters to an intermediate node at step 202. The intermediate node receives the transmission of the mailing job parameters at step 204 and re-transmits those parameters to the terminal node at step 206. At step 208, the terminal node receives the mailing job, parses the instructions and then sets up the mailing for production. The method and system would complete the mailing production at step 210.

Figure 3D:
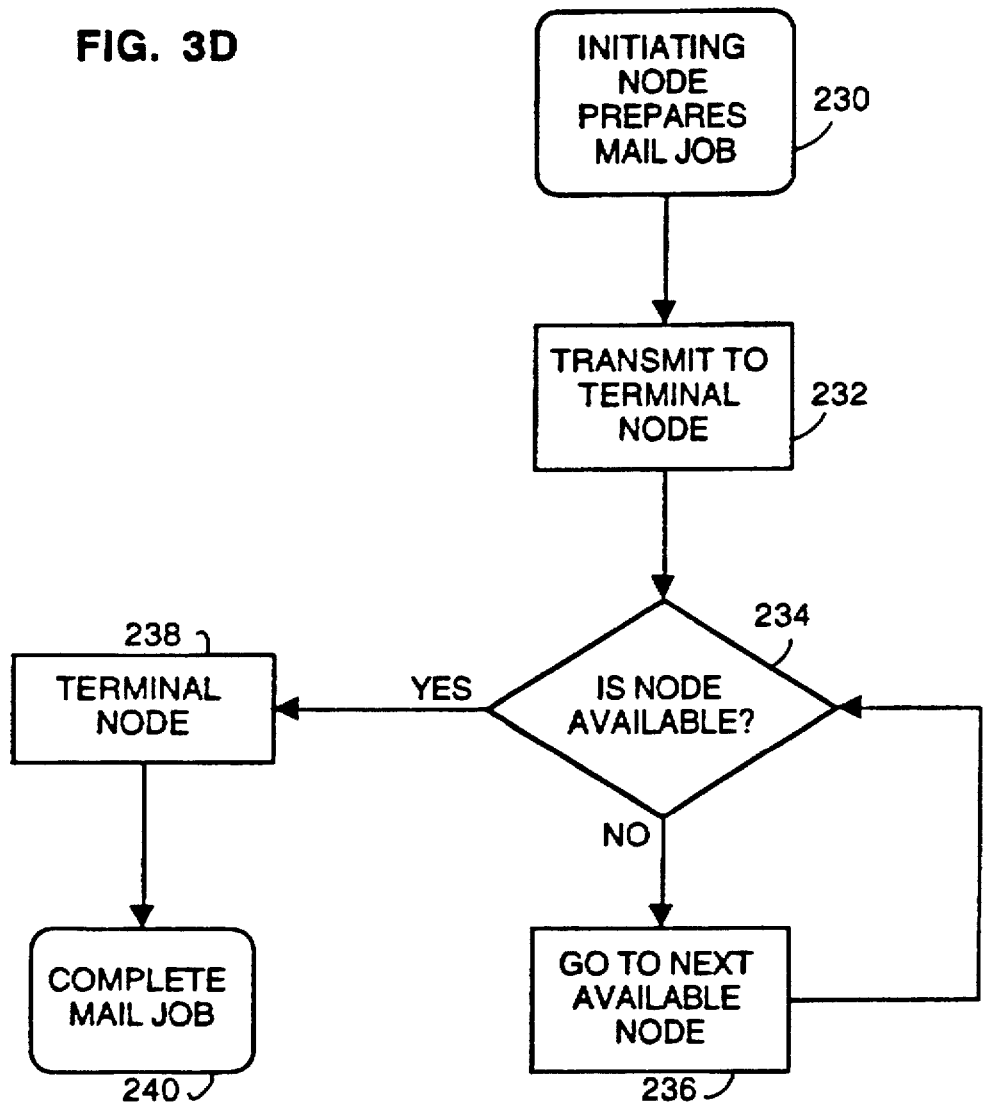

FIG. 3D utilizes the efficiencies of the FIG. 3C embodiment, but expands the possibilities available for selection of a terminal node by backing up the terminal node with an alternative routing if the intended terminal node is either busy, off-line, not capable of producing the requested mailpiece, or not geographically suitable. In this embodiment, the decision not to utilize the intended terminal node is made by the intended terminal node. The transmission is then routed to the next available terminal node available from a predetermined list of available nodes.

In FIG. 3D, the initiating node defines the mailing parameters at step 230 and transmits those parameters to the terminal node at step 232. The terminal node receives the transmission of the mailing job parameters at step 234 and poses a query as to whether or not the designated terminal node is prepared to produce the defined mailing. If the response to the query is "NO," then the terminal node will send the transmission, at step 236, to the next available terminal node that is listed on a pre-determined list of available terminal nodes. The method then returns to step 234 to query as to whether or not the newly designated terminal node is available. If the next terminal node on the list is not available, then the system will attempt to transmit to each node listed until the list has been exhausted. If communication has been attempted to each node on the list of available nodes and a completed transmission of the mailing parameters has not occurred, then it is a matter of network preference as to whether or not the system will continue to cycle through the list making attempts at transmission or, whether the system will simply indicate back to the initiating node that the transmission was unsuccessful.

Returning to the query at step 234, if the response to the query is "NO," then the method would advance to step 238 where the terminal node receives the mailing job, parses the instructions, and then sets up the mailing for production. The method and system complete the mailing production at step 240.

Figure 3E:
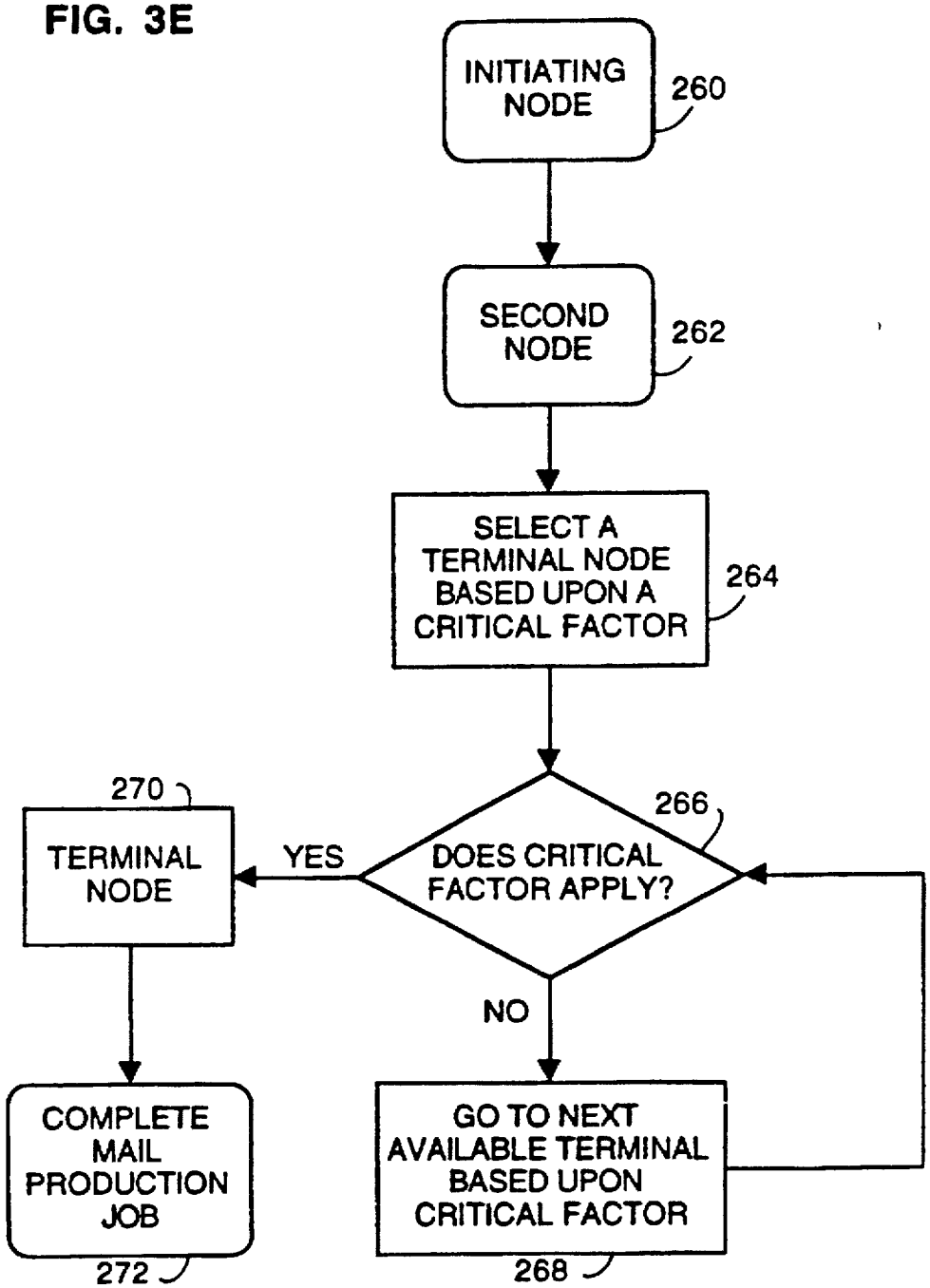

FIG. 3E utilizes the efficiencies of the FIG. 3D embodiment, but expands the possibilities available for selection of a terminal node by establishing a server location that allows the system to select optimal routing of the mailing job based upon at lease one set of critical factors. In this embodiment, the decision of which terminal to utilize is made at an intermediate node based upon a selection from a list of terminal nodes available and further based upon at least one critical factor such as geographic location, availability of resources, location vis-à-vis mailing destination, localized billing requirements, or any from a long list of possible choices defined by business, technological, or legal needs. The transmission is then routed by the second node to the optimal terminal node available from the pre-determined list of available nodes.

In FIG. 3E, the initiating node defines the mailing parameters at step 260 and transmits those parameters to an intermediate node at step 262. The intermediate node receives the transmission of the mailing job parameters at step 262 and then selects at step 264 a terminal node based upon a critical factor (i.e. geographic location, production capability, etc.) in light of a pre-determined list of available terminal nodes. From step 264, the method advances to step 266 and poses a query as to whether or not the designated terminal node is prepared to produce the defined mailing. If the response to the query is "NO," then the terminal node will send the transmission, at step 268, to the next available terminal node (qualifying node) that is listed on a pre-determined list of available terminal nodes and that meets the pre-determined critical factor. The method thus returns to step 266 to query if the newly designated terminal node is available. If the next terminal node on the list is not available, then the system will attempt to transmit to each qualifying node listed until the list has been exhausted. If communication has been attempted to each node on the list of qualifying nodes and a completed transmission of the mailing parameters has not occurred, then it is a matter of network preference as to whether or not the system will continue to cycle through the list making attempts at transmission or, whether the system will simply indicate back to the initiating node that the transmission was unsuccessful.

Returning to the query at step 266, if the response to the query is "NO," then the method advances to step 270 where the terminal node receives the mailing job, parses the instructions, and then sets up the mailing for production. The method and system complete the mailing production at step 272.

It should be noted that with the possibilities available in networking facilities, it is entirely within the capabilities of the method and system to have variations of the communications paths illustrated by FIGS. 3A–3E wherein several embodiments as described may exist within a particular network.

Turning to FIG. 4, there are shown the steps required for selection of the optimal transmission path. The selection process begins at step 300 and is initiated at the node where the communications packet is created. The method advances to a query at step 302. At step 302, the method queries as to whether or not the selection of a particular digital carrier is required for transmission of the communications packet. If the response to the query is "YES," then the method advances to step 304 where the desired carrier is selected. If, however the response to the query at step 302 is "NO," then the method advances to step 306 where the system operator presses "ENTER" to select a default carrier. Both steps 304 and 306 advance to the query at step 308.

At step 308, the method queries as to whether or not a particular means of delivery is required for production of the finished mailpiece. If the response to the query is "YES," then the method advances to step 310 where the desired delivery means is selected and a weight assigned to the delivery means. The weight can be a factor of 1, or represent enough of a value to eliminate a node from the optimal transmission path should that node not be able to support the required delivery means. If, however, the response to the query at step 308 is "NO," then the method advances to step 312 where the system operator presses "ENTER" to select a default delivery means. Both steps 310 and 312, advance to the query at step 314.

At step 314, the method queries as to whether or not all of the nodes on a particular network are available. If the response to the query is "YES," then the method advances to a query at step 318. If, however, the response to the query at step 314 is "NO," then the method advances to step 316 where the system determines all available nodes on the network a default node can be selected at this step. Both steps 314 and 316, advance to the query at step 318 where the method queries as to whether or not the destination node is to be determined based upon location. If the response to the query is "YES," then the method advances to step 320 where each of the available nodes is ranked and weighted based upon the location of the node relative to the destination of the mailpieces to be produced. From step 320, the method advances to step 322. If, however, the response to the query at step 318 is "NO," then the method advances directly to step 322.

At step 322, the method determines an average weight for each of the available nodes, unless a default node has been selected at step 316. The average weight is used to rank the available nodes on the network and to eliminate those that cannot support production or transmission of the communications packet. From step 322, the method advances to step 324 where the communications packet is transmitted to the destination node over the optimal path.

As can be appreciated by those skilled in the art, a number of variations of the subject invention are possible. These variations include, but are not limited to: the nature of the system elements at each node in the transmission path; the default parameters that can be established at each of the query points; and, the ability to split a communications packet into separate sub-packets if required by the formatting requirements of step 110. It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method of channeling message traffic comprising the steps of:

(a) drafting a message and a corresponding destination address together in electronic form;

(b) selecting a set of parameters from among a plurality of choices wherein said set of parameters define a method of conversion of said electronic form to a tangible form whereby a predetermined standard for delivery may be met;

(c) transmitting said message and said destination address via a digital carrier to a printing means, whereby said electronic form can be converted, by utilization of said defined conversion method, to a human readable form; and wherein said transmission to said printing means, further comprises the steps of;

(i) transmitting said message and said destination address together with said set of conversion parameters, as a packet, to a routing facility via a digital carrier, whereby said routing facility will select a transmission path find assign a set of transmission parameters whereby said packet will be transmitted to a terminal node for conversion and printing; and (ii) transmitting said packet to said terminal node from said routing facility and wherein said terminal node comprises receiving means for said packet and said printing means; and, wherein said transmission to said terminal node, further comprises the steps of;

(iii) selecting, at said routing facility, an optimal transmission path from among a plurality of available transmission paths, said selection determined by analysis of a plurality of factors;

(iv) weighing each of said plurality of factors and then determining which of said possible paths has the greatest score;

(v) selecting an optimal transmission path by determining which path on said predetermined list has a highest weighted score among said possible paths; and (vi) initiating a transmission of said packet wherein said transmission is initiated by said routing facility along said optimal transmission path;

(d) converting said electronic form to said human readable form by printing said message on a medium and printing said destination address on an envelope;

(e) forming a finished mail piece from said printed medium and said printed envelope;

(f) delivering said finished mail piece into a local mail stream for delivery to said destination address.

2. The method of claim 1 wherein said mail piece is formed, comprising the further steps of:

(a) inserting said printed medium into said printed envelope;

(b) sealing said envelope; and (c) franking said envelope with a postage value.

3. The method of claim 1, wherein said plurality of factors further comprises:

(a) carrier means for carrying said packet to said terminal node;

(b) delivery means for delivering said packet to said printing means;

(c) time and date standards;

(d) availability of a particular terminal node from among a predetermined list of possible terminal nodes; and (e) geographic location of said particular terminal node or said predetermined list of possible terminal nodes.

4. The method of claim 1, wherein said weight of each of said factors will be zero if said path is not available.

5. The method of claim 1, wherein said initiating node and said routing facility are co-located.

6. The method of claim 1, wherein said transmission path comprises a plurality of sub-paths.

7. The method of claim 6, wherein each of said sub-paths comprises a channel, said channel being one of a plurality of communication means available for transmitting digitized communications.

8. A system for channeling message traffic comprising:

(a) an initiating node, a routing facility, and a destination node;

(b) message production means for creating a message and a corresponding destination address in electronic form at said initiating node;

(c) selection means located at said routing facility for selecting an optimal set of transmission characteristics by which said electronic message and said destination address will be transmitted;

(d) transmission means located at said routing facility for transmitting said electronic message and said destination address to said destination node; and wherein said transmission means further comprises;

(i) first packet transmission means for transmitting said packet to a routing facility via a digital carrier, whereby said routing facility will select a transmission path and assign a set of transmission parameters whereby said packet will be transmitted to a terminal node for conversion and printing; and (ii) second packet transmission means for transmitting said packet to said terminal node from said routing facility and wherein said terminal node comprises receiving means for said packet and said printing means; and, wherein said transmission to said terminal node, further comprises;

(iii) selection means for selecting, at said routing facility, an optimal transmission path from among a plurality of available transmission paths, said selection determined by analysis of a plurality of factors which are weighted;

(iv) determining means for determining which of said possible paths, has the greatest score;

(v) selection means for selecting an optimal transmission path by determining which path on said predetermined list has a highest weighted score among said possible paths; and (vi) transmission initiation means for initiating a transmission of said packet wherein said transmission is initiated by said routing facility along said optimal transmission path;

(e) receiving means for receiving, at said destination node, said electronic message and said destination address;

(f) printing means located at said destination node for printing said electronic message to a medium and for printing said destination address to an envelope; and (g) mail piece production means located at said destination node for producing a finished mail piece by inserting said printed message into said envelope, sealing said envelope, and franking said sealed envelope.

9. The method of claim 8, wherein said initiating node and said routing facility are co-located.

10. The system of claim 8, wherein said transmission means further comprises routing means for routing said electronic message to said receiving means at said destination node as distinguished from among a plurality of possible destination nodes.

11. The system of claim 8, wherein said transmission means further comprises routing means for routing said electronic message to said receiving means at said destination node as distinguished from among a plurality of possible receiving means.

12. The system of claim 10, or of claim 11, wherein said routing means further comprises:

(a) second receiving means for receiving said electronic message from said initiating node;

(b) selecting means for selecting an optimal transmission path for retransmitting said electronic message to said destination node; and (c) second transmitting means for transmitting said electronic message from said routing means to said destination node via said optimal transmission path.

* * * * *